Patented Oct. 11, 1949

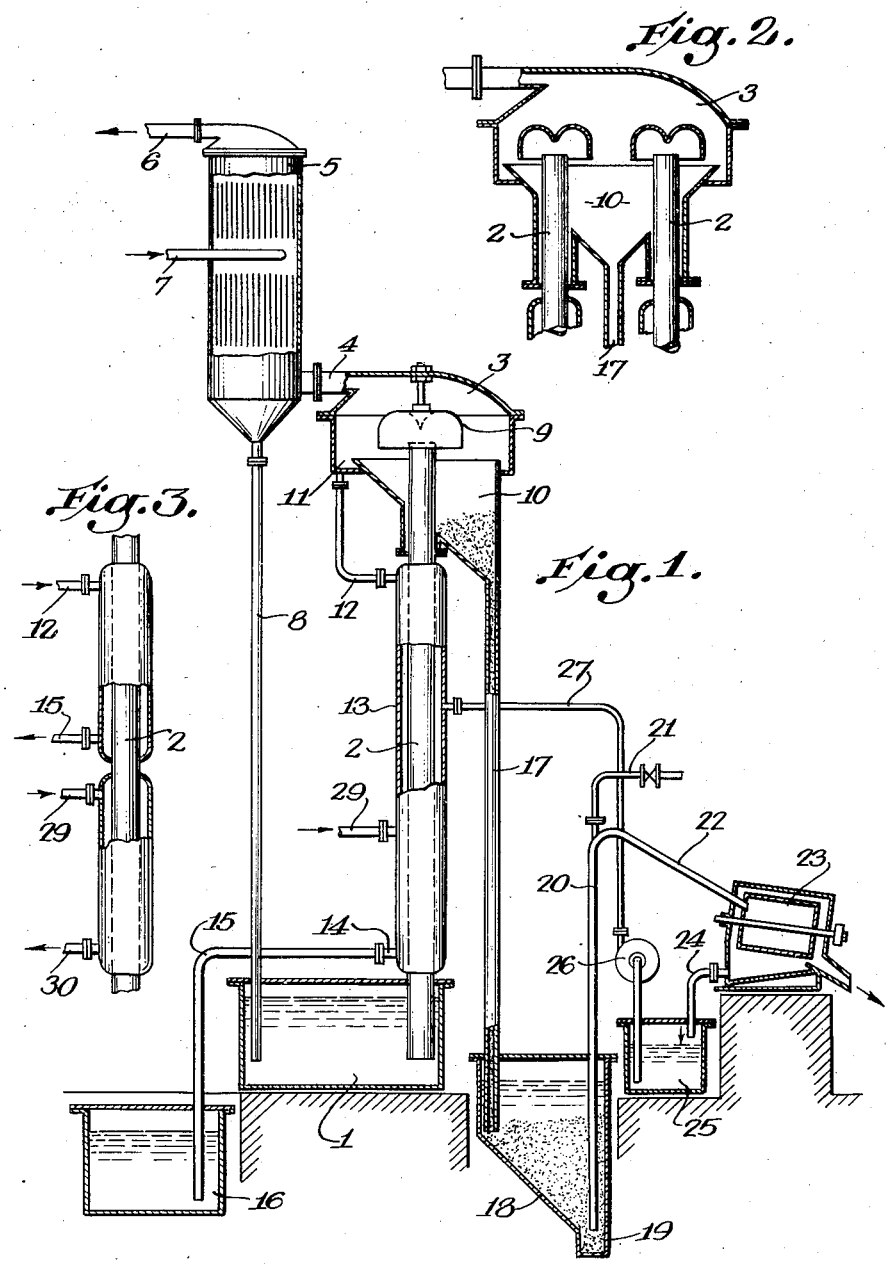

2,484,799

UNITED STATES PATENT OFFICE 2,484,799

PROCESS AND APPARATUS FOR PURIFYING PICKLING ACID AND RECOVERING SULFATES THEREFROM

Norman Swindin, London, England

Application June 20, 1946, Serial No. 678,148
In Great Britain May 9, 1946

6 Claims. (Cl. 23—295)

1

This invention relates to a method of and means for the purification and revivification of acid pickling liquors, such as are employed for de-scaling of iron and steel products.

The object of the invention is to enable a recovery plant to be manufactured for small outputs, to avoid the use of expensive refrigerating machines or devices and wherein only a small amount of cooling water is necessary.

A further object is to produce a continuous process wherein the strength of the pickling liquor is maintained at a constant acid value with simultaneous removal of ferrous sulphate crystals in ratio to their formation or accumulation and by heat exchange methods the warmth of the spent pickling liquor in its movement is imparted to the purified liquor treated. Additionally, the supply of fresh make-up sulphuric acid is used as a water vapor condensing and liquor cooling agent, whereby such acid supply becomes heated under exothermic reaction and is fed direct to the pickle tank at or about the working temperature of the pickle liquor.

The above objectives are achieved by the application of a relatively high vacuum to a series of barometric columns whose heights are pre-adjusted to the gravities of the liquors therein and wherein one of said columns hereinafter referred to as the main column, is employed for ferrous crystals removal by overflow, and wherein the velocity of upward flow exceeds in entrainment that of any tendency of said crystals to gravitate downwardly. The contents of this main column is refrigerated by acid absorption of its vapors and through its annular jacket during the upward passage of the liquors through said main column, causing further ferrous crystal formation by reason of such cooling, the refrigerating medium being a continuous supply of cold crystal free pickle liquor circulating within the column jacket, which latter liquor becomes heated and returns either to the pickle tank or a separate make-up tank, and this liquor is supplemented by the addition of cold water in such volume as to make up any deficiency caused by evaporation or crystal requirements.

The invention consists in a process and apparatus for the purification and revivification of acid pickling liquors for iron and steel comprising a continuous method of operation wherein the hot acid pickling liquor with latent or suspended crystalline matter is caused to ascend and be cooled within and upon overflow from a jacketed barometric column subject to high vacuum, said liquor overflow being cooled by sulphuric acid

2 absorption of its vapors, and the contents of said column cooled by said overflow and purified cool treated acid liquor circulating in the jacket of said column.

The process further comprises the step wherein the sulphuric acid used for condensation of pickle liquor vapor is returned in a heated condition to the pickling tank.

The invention is further characterised that the velocity of upward flow of pickle liquor within the main barometric column exceeds the velocity of descent of crystal ferrous sulphate passing in said column by entrainment or as the result of cooling.

In order that the invention shall be more fully understood reference is made to the accompanying drawings wherein:

Fig. 1 shows in a diagrammatic form the means for carrying out the invention,

Fig. 2 shows details of the heat outlet pipes of the main barometric column,

Fig. 3 shows details of main column cooling jackets.

Referring to Fig. 1 the pickle liquor tank I is provided with a barometric column 2, or as stated hereinafter there may be more than one of said columns which rise vertically from said tank I and terminates at its upper extremity within a closed suction head tank 3, said tank being provided with a vapor pipe 4 leading to an absorption tower 5, the upper part of said vessel 5 being connected by conduit 6 to a high vacuum pump (not shown). Within the absorption tower 5 is arranged a series of baffles formed of spun glass or equivalent non-corrodible material, said baffles being subject to a spray of sulphuric acid introduced to said absorption tower by spray pipe 7. The acid liquor issuing from spray 7 condenses the water vapor present in said absorption tower and the acid liquor falls by gravity by acid delivery pipe 8 to the pickle liquor tank I. It will be noted that the height of the pipe 8 is adjusted under barometric conditions so that the foot of the pipe allows the acid, which has an average gravity of 1.6, to enter the pickle tank as a continuous feed. To allow for barometric variations a safety depth of liquor must be present in tank I, as well as tanks I6 and I8.

Disposed over the main barometric column 2 within the closed suction tank 3 is a deflector 9 and disposed below the deflector is a tank I0 which is preferably downwardly tapered and whose entrance is raised above the base of hooded tank 3 so as to form a launder II. Said launder has a conduit connection I2 to the uppermost part of the jacket I3 of the main column 2.

The said jacket 13 is also supplied with a small inlet 29 of cold make-up water, and the fluids circulating in the said jacket which become heated in transit are drained off at the base of the jacket at 14 by conduit 15 to regenerative store tank 16, said tank 16 owing to difference of gravity of the liquor entering is at a lower level in the installation to that of the tank 1, said tank 16 requiring a greater head of liquor than tank 1. The tank 10 is supplied with a downpipe leg 17 whose delivery end enters a lower preferably downwardly tapered tank 18. This said tank is provided with a boot 19 within which is disposed an air lift of known type consisting of an outer pipe 20 and an inner pressure air inlet pipe 21. This air lift is adapted to remove crystals accumulating in the boot 19 and to deliver them through pipe 22 into a centrifugal or other separator 23, from whence the crystals are discharged, the filtrate being led by pipe 24 to liquor tank 25 from which it is raised by pump 26 and fed to the jacket 13 of the main column 2 by means of conduit 27.

In Fig. 2 an alternative construction is shown wherein there are two main barometric columns 2 in lieu of one, the said columns discharging to a common conical tank 10 formed at the base of the suction head tank 3. In this form the descending liquor pipe 17 is disposed between the two main columns and is fed by the overflow from each of the said columns 2.

The operation of the invention is as follows:

The settled hot spent liquor is fed by suitable means to tank 1.

Under vacuum suction imparted to the head tank 3 the liquor from the pickle tank 1 together with its latent crystal matter or crystals already formed rises up the main column 2 and overflows past the deflectors 9 into the tank 10, wherein the crystals separate and tend to pack so that some liquor passes over to the launder 11 and flows down the pipe 12 into the jacket 13 of the column 2. The liquor in the tank 10 together with its crystal matter descends through the pipe 17 into the lower tank 18. The temperature of the liquor as the issue point from column 2 is about 5° to 10° C. The lower end of the jacket 13 is fitted with an outlet 14 and pipe 15 (as shown in Fig. 1) said pipe being sealed within the liquor of store-up tank 16. The water vapor formed under action of the vacuum pump from the liquor in the vessels 3 and 10 is absorbed in the absorption tower 5 by strong sulphuric acid in amount to approximate the loss of such acid in the formation of ferrous sulphate and which latter is removed from the pickling liquor. The acid is sprayed on to a bed of absorbing material such as glass fibres in order to present the greatest surface to the vapors with the minimum of resistance. The sulphuric acid required has a specific gravity of 1.8 and by absorption of water vapor becomes diluted and descends in the barometrically controlled pipe 8 which said pipe is liquid sealed in the tank 1.

It is known that the supply of sulphuric acid to iron pickling liquors reduces the solubility of ferrous sulphate, so this additional supply of such acid to the tank 1 materially adds to the recovery of the resulting iron salts. Water at the lowest service temperature, say between 10° to 20° C. equivalent to the amount of water of crystallisation contained in the copperas is admitted to the cooling jacket 13 of the main barometric column 2 at 29 (see Fig. 1) to take advantage of its added cooling capacity and further cooling water can be used segregated from the other liquids in the said jacket by dividing said jacket into two parts (see Fig. 3), the upper part being cooled by cold pickle liquor by entry through pipe 12 and this liquor drained off to tank 16, whilst the lower part of the casing is drained by pipe 30 to waste. Hence the liquor in the main column 2 (see Fig. 1) is cooled by three streams of liquid (1) the liquor from pipe 12 and (2) pipe 27, which may be termed regenerative cooling and (3) the added water from inlet 29, and outlet 14, with a fourth stream of supplementary cooling water in the arrangement shown in Fig. 3.

In order to maintain as high a vacuum as possible upon the barometric column 2 and yet have a relatively small vacuum pump, it is necessary that the liquor in the rising column 2 be as cold as possible. In some cases and in some locations it may be necessary to cool the liquor entering the column 2 from say 50° to 70° C. to 25° C. so as to obtain a suction head temperature of liquor at 0° C. by regenerative cooling. It will also be observed that from one vacuum pump there are four columns of liquid dependent upon barometric pressure, i. e. the main column 2, the jacket 13 or upper jacket 13, the crystal discharge pipe 17, and the sulphuric acid pipe 8. The accumulated crystal matter and liquor in tank 18 is elevated by the air lift 20 into the crystal separator 23, the filtered clear liquor being raised by pump 26 into the jacket 13 of the main column 2 as set out above.

I claim:

1. A process for purifying and revivifying a solution of metal sulphates in sulphuric acid comprising causing said hot solution with precipitated metal sulphates to ascend a barometric column under high vacuum so as to overflow from the top thereof, evaporating vapors from said overflowing solution under vacuum and absorbing said vapors with sulphuric acid to cool said overflowing solution, collecting said overflowing solution and separating the precipitated metal sulphates therefrom, and causing said overflowing solution from which the precipitated metal sulphates have been separated to flow around said column in a direction counter to the unseparated solution ascending therein to cool said unseparated solution.

2. A process for purifying and revivifying a solution of metal sulphates in sulphuric acid comprising causing said hot solution with precipitated metal sulphates to ascend a barometric column under high vacuum so as to overflow from the top thereof, evaporating vapors from said overflowing solution under vacuum and absorbing said vapors with sulphuric acid to cool said overflowing solution, collecting said overflowing solution and separating the precipitated metal sulphates therefrom, causing said overflowing solution from which the precipitated metal sulphates have been separated to flow around said column in a direction counter to the unseparated solution ascending therein to cool said unseparated solution, and returning to the solution for treatment said sulphuric acid and absorbed vapors in a heated condition and in a quantity corresponding to the amount of precipitated metal sulphates removed therefrom.

3. A process for purifying and revivifying a solution of metal sulphates in sulphuric acid comprising causing said hot solution with precipitated metal sulphates to ascend a barometric column under high vacuum at a rate of flow exceeding in entrainment the rate of descent therein of precipitated metal sulphates so as to overflow from the top thereof, evaporating vapors from said overflowing solution under vacuum and absorbing said vapors with sulphuric acid to cool said overflowing solution, collecting said overflowing solution and separating the precipitated metal sulphates therefrom, causing said overflowing solution from which the precipitated metal sulphates have been separated to flow around said column in a direction counter to the unseparated solution ascending therein to cool said unseparated solution, and returning to the solution for treatment said sulphuric acid and absorbed vapors in a heated condition and in a quantity corresponding to the amount of precipitated metal sulphates removed therefrom.

4. Apparatus for purifying and revivifying iron and steel acid pickling liquors, comprising: a container for impure pickling liquor, a vertical barometric column sealed into said container, a jacket enclosing said column, an upper tank open at the top and sealed around said column below the top end thereof to receive liquor overflow therefrom, a lower tank arranged below said upper tank and having a barometric column connecting it therewith, a chamber enclosing the open top of said upper tank and arranged to receive liquor overflow therefrom and communicating with said jacket at the upper portion thereof, an acid spray chamber communicating at its lower portion with the top of said chamber and with said impure liquor container, a vacuum pump connected to said spray chamber at the upper portion thereof, a device for separating solid matter from the liquor connected to said lower tank and arranged to supply purified liquor to the upper portion of said jacket, and an open container communicating with the base of said jacket to receive purified liquor therefrom.

5. Apparatus for purifying and revivifying iron and steel acid pickling liquors comprising: a container for impure pickling liquor, a vertical barometric column sealed into said container, a jacket enclosing said column, an upper tank having an open top and sealed around said column below the top end thereof to receive liquor overflow therefrom, a lower tank arranged below said upper tank and having a barometric column connecting it therewith, a chamber enclosing the open top of said upper tank and arranged to receive liquor overflow therefrom and communicating with said jacket at the upper portion thereof, an acid spray chamber communicating at its lower portion with the top of said chamber and with said impure liquor container, a vacuum pump connected to said spray chamber at the upper portion thereof, a device for separating solid matter from the liquor connected to said lower tank and arranged to supply purified liquor to the upper portion of said jacket, a connection to the central portion of said jacket for supplying water thereto, and an open container communicating with the base of said jacket to receive purified liquor and water therefrom.

6. Apparatus for purifying and revivifying iron and steel acid pickling liquors comprising: an open container for impure pickling liquor, a vertical barometric column sealed into said container, upper and lower jackets enclosing said column, an upper tank having an open top sealed around said column below the upper end thereof to receive liquor overflow therefrom, a lower tank arranged below said upper tank and having a barometric column connecting it therewith, a chamber enclosing the open top of said upper tank and arranged to receive liquor overflow therefrom and communicating with said upper jacket at the upper portion thereof, an acid spray chamber communicating at its lower portion with the top of said chamber and with said open impure liquor container, a vacuum pump connected to said spray chamber at the upper portion thereof, a device for separating solid matter from the liquor connected to said lower tank and arranged to supply purified liquor to the upper portion of said upper jacket, a connection to the upper portion of said lower jacket for supplying water thereto, and an open container communicating with the bases of said jacket to receive purified liquor and water therefrom.

NORMAN SWINDIN.

REFERENCES CITED

The following references are of record in the file of this patent:

UNITED STATES PATENTS

| Number | Name | Date |
|---|---|---|
| 1,006,823 | Black | Oct. 24, 1911 |
| 1,369,451 | Marsh | Feb. 21, 1921 |
| 1,560,473 | Howard | Nov. 3, 1925 |
| 1,873,329 | Ritchie | Aug. 23, 1932 |
| 2,037,595 | Schaefer | Apr. 14, 1936 |